(12) United States Patent
Rosell et al.

(10) Patent No.: US 12,151,863 B2
(45) Date of Patent: Nov. 26, 2024

(54) PUSH THROUGH BLISTER PACKAGE WITH PLASTIC LIDDING

(71) Applicant: LIVEO RESEARCH AG, Basal (CH)

(72) Inventors: Nuria Rosell, Freiburg (DE); Oliver Paillereau, Müllheim (DE); Carsten Heldmann, Peine (DE); Andreas Josef Pfefferle, Ehrenkirchen (DE)

(73) Assignee: LIVEO RESEARCH AG, Basal (CH)

( * ) Notice: Subject to any disclaimer, the term of this patent is extended or adjusted under 35 U.S.C. 154(b) by 0 days.

(21) Appl. No.: 18/528,386

(22) Filed: Dec. 4, 2023

(65) Prior Publication Data

US 2024/0182222 A1 Jun. 6, 2024

Related U.S. Application Data

(60) Provisional application No. 63/386,156, filed on Dec. 5, 2022.

(51) Int. Cl.
*B65D 75/36* (2006.01)
*B29C 48/00* (2019.01)
(Continued)

(52) U.S. Cl.
CPC ........ *B65D 75/367* (2013.01); *B29C 48/0021* (2019.02); *B29C 48/08* (2019.02);
(Continued)

(58) Field of Classification Search
CPC ...... B65D 75/367; B65D 65/42; B65D 75/26; B65D 2565/38; B65D 75/36;
(Continued)

(56) References Cited

U.S. PATENT DOCUMENTS

495 A * 12/1837 Ames ........................ B05C 3/12
62/345
2,221,414 A 11/1940 Schmidt
(Continued)

FOREIGN PATENT DOCUMENTS

CA 2716988 A1 * 9/2009 ............. B29C 48/08
CN 203899130 10/2014
(Continued)

OTHER PUBLICATIONS

Translation of JP 2010503588.*
(Continued)

*Primary Examiner* — Sonya M Sengupta
(74) *Attorney, Agent, or Firm* — Fox Rothschild LLP

(57) ABSTRACT

Provided is a single material plastic push-through blister pack for food and pharmaceutical packaging and a method of making thereof. The blister package may be produced by thermoforming polymer films for the cavity and a cavitated polymer film made from the same class of polymer comparatively lower thickness for the substrate or lid. To facilitate the push through breaking, the polymer film used as the lidding film may be modified to a microcavitated film by creating micro-voids/cavities and micro-brittleness within the polymer matrix. These micro-voids/cavities, and/or embedded microcrystalline particles present in the polymer matrix of the lidding film, may create internal cracks in the film by application of a small external force, which may then result in rupturing of the lid film to dispense a product from the cavity of the blister pack.

20 Claims, 7 Drawing Sheets

(51) Int. Cl.
  *B29C 48/08* (2019.01)
  *B29C 51/26* (2006.01)
  *B29K 67/00* (2006.01)
  *B29K 105/00* (2006.01)
  *B29L 31/00* (2006.01)
  *B32B 3/28* (2006.01)
  *B32B 27/08* (2006.01)
  *B32B 27/18* (2006.01)
  *B32B 27/36* (2006.01)
  *B65D 65/42* (2006.01)
  *B65D 75/26* (2006.01)

(52) U.S. Cl.
  CPC .............. *B29C 51/266* (2013.01); *B32B 3/28* (2013.01); *B32B 27/08* (2013.01); *B32B 27/18* (2013.01); *B32B 27/36* (2013.01); *B65D 65/42* (2013.01); *B65D 75/26* (2013.01); *B29K 2067/003* (2013.01); *B29K 2105/0005* (2013.01); *B29K 2995/0053* (2013.01); *B29K 2995/0081* (2013.01); *B29L 2031/7164* (2013.01); *B32B 2250/244* (2013.01); *B32B 2255/10* (2013.01); *B32B 2264/10* (2013.01); *B32B 2307/518* (2013.01); *B32B 2307/582* (2013.01); *B32B 2307/704* (2013.01); *B32B 2439/80* (2013.01); *B65D 2565/386* (2013.01)

(58) Field of Classification Search
  CPC .............. B65D 75/325; B65D 2585/56; B29C 48/0021; B29C 48/08; B29C 51/266; B32B 3/28; B32B 27/08; B32B 27/18; B32B 27/36; B32B 2250/244; B32B 2255/10; B32B 2264/10; B32B 2307/518; B32B 2307/582; B32B 2307/704; B32B 2439/80; B29K 2067/003; B29K 2105/0005; B29K 2995/0053; B29K 2995/0081; B29L 2031/7164; A61J 1/035; A61J 1/03
  USPC ............ 206/528, 531, 538; 53/453; 536/559
  See application file for complete search history.

(56) References Cited

U.S. PATENT DOCUMENTS

| | | | |
|---|---|---|---|
| 3,120,197 A | | 2/1964 | Cirami |
| 3,809,221 A | * | 5/1974 | Compere .............. B65D 75/327 |
| | | | 206/820 |
| 5,213,547 A | | 5/1993 | Lochtefeld |
| 5,277,472 A | | 1/1994 | Freese et al. |
| 5,613,443 A | | 3/1997 | Ariga et al. |
| 5,830,547 A | * | 11/1998 | Mackenzie ............. B32B 27/32 |
| | | | 428/36.1 |
| 6,220,171 B1 | | 4/2001 | Hettema et al. |
| 6,340,280 B1 | | 1/2002 | Mollick et al. |
| 7,094,157 B2 | | 8/2006 | Fromyer et al. |
| 7,565,910 B2 | | 7/2009 | Alexakis |
| 8,453,579 B2 | | 6/2013 | Nemeth |
| 8,641,543 B2 | | 2/2014 | Lochtefeld |
| 9,694,959 B2 | | 7/2017 | Priscal et al. |
| 9,827,503 B2 | | 11/2017 | Freeman et al. |
| 10,463,982 B2 | | 11/2019 | Masterson et al. |
| 10,556,732 B2 | * | 2/2020 | Cassidy ............. B65D 77/2024 |
| 11,077,999 B2 | * | 8/2021 | Bomba ................. B65D 77/30 |
| 2007/0042147 A1 | * | 2/2007 | Altman ..................... C08J 5/18 |
| | | | 428/421 |
| 2009/0314664 A1 | | 12/2009 | Henke et al. |
| 2011/0005961 A1 | * | 1/2011 | Leplatois ................ B29C 48/08 |
| | | | 156/60 |
| 2011/0132794 A1 | | 6/2011 | Ingraham |
| 2013/0032053 A1 | | 2/2013 | Stoker |
| 2017/0081100 A1 | | 3/2017 | Puguh et al. |
| 2017/0158400 A1 | | 6/2017 | Priscal et al. |
| 2020/0086220 A1 | | 3/2020 | Sabens et al. |
| 2020/0236461 A1 | | 7/2020 | Hall et al. |
| 2022/0024663 A1 | | 1/2022 | Priscal et al. |

FOREIGN PATENT DOCUMENTS

| | | | |
|---|---|---|---|
| CN | 204745689 | 11/2015 | |
| CN | 204745690 | 11/2015 | |
| CN | 209548690 | 10/2019 | |
| CN | 110884518 | 3/2020 | |
| CN | 211107431 | 7/2020 | |
| CN | 211302058 | 8/2020 | |
| CN | 112791424 | 5/2021 | |
| CN | 214436472 | 10/2021 | |
| DE | 20115902 | 2/2003 | |
| JP | 2004114582 | 4/2004 | |
| JP | 2004217289 | 8/2004 | |
| JP | 2006298394 | 11/2006 | |
| JP | 4078208 B2 * | 4/2008 | ........... B65D 75/327 |
| JP | 2009082287 | 4/2009 | |
| WO | 2008007569 | 1/2008 | |
| WO | 2010039375 | 4/2010 | |
| WO | 2010119459 | 10/2010 | |
| WO | 2020206301 | 10/2020 | |

OTHER PUBLICATIONS

Translation of CN 1894141.*
Translation of JP 4078208.*
International Search Report and Written Opinion for International PCT Patent Application No. PCT/IB2023/062214, mailed Feb. 13, 2024 (10 pages).

* cited by examiner

PUSH THROUGH BLISTER PACKAGE WITH PLASTIC LIDDING

CROSS-REFERENCE TO RELATED APPLICATION

This application claims the benefit of priority to U.S. provisional patent application No. 63/386,156 filed on Dec. 5, 2022, the entire contents of which are incorporated herein by reference.

BACKGROUND

Currently, push-through blister packs in the pharmaceutical industry are comprised of a plastic cavity in which a product is stored and sealed with hard-tempered aluminum foil generally with a thickness between 18 and 25 microns. While aluminum-based lid foils offer an almost complete barrier, due to the tight coverage over the cavity as well as the brittle nature of the hard tempered aluminum foil lid, it is easy to produce pinholes, puncture the film, and even tear the blister pack during transportation and handling, thus exposing the content of the cavity to the environment such as moisture and dust. Such external stimuli result in the degradation of the drug, leading to loss of potency and even drug inactivity for certain classes of moisture-sensitive drugs. Furthermore, due to the combination of plastic and aluminum materials, current blister packs cannot be readily processed for recycling.

In response, a single material push-through blister pack, wherein both the cavity and the lid are comprised of the same material, has been explored. However, due to the high strength and flexible nature of the plastic, the plastic lid component does not break easily and often results in physical damage to the tablet during the dispensing process.

To overcome this drawback, external weakening of the plastic lid films via micro-perforation, mechanical weakening has been tried. However, this mechanism can also create pores through which moisture is introduced to the cavity, and even cause sealing issues resulting in the same issue of moisture ingression into the product causing a shelf-life problem. Also, other weakening techniques like Lasering need additional steps and equipment in the blister making process which could significantly lower line productivity.

Another proposed design has been a "peelable" opening feature instead of a push-through pack by applying a peelable adhesive on the lidding film. However, this requires the blister pack to be bigger to accommodate the unsealed "flange" for each cavity. This design makes the blister packs unnecessarily bulkier and requires more packaging material not only for the primary packaging but also for the secondary as well as the tertiary packaging, thus increasing the overall production cost. This also puts a greater burden on the environment by producing unnecessary packaging waste. Also, the peelable opening feature is not popular among senior citizens due to their motor-function restrictions in using their fingers to catch and pull on the small and delicate flange. Furthermore, the pulling motion via catch and pull is more difficult to achieve than a simple push-through motion, especially for senior citizens or patients with reduced or impaired motor function.

Accordingly, single material, push-through blister pack that is easily recyclable without sacrificing the structural integrity of the blister packs, packaging productivity as well as the dispensability of the cavity content is highly desired and needed in the field of pharmaceutical drug packaging.

SUMMARY

A purpose of this disclosure is to overcome the current challenges blister packages for medication packages face in sustainability requirements with respect to plastics, especially in recycling norms without compromising patient usage friendliness and manufacturing easiness.

A cavitated polymer film, produced by compounding with additives such as inorganic additives and/or incompatible polymers which creates discontinuity in the polymer matrix during the film forming process. This modification results in internal rupture of the polymer, which, with a certain degree of push force, will result in the breaking of the whole film.

One or more embodiments of the present disclosure are directed to push-through blister packs (or blister package), primarily for pharmaceutical packaging, may be produced from the same-class plastic components for both the blister layer and the lidding films or substrate, without the need for additional external processing of the material to weaken the lidding film post-manufacturing. The lidding film of the blister pack may be produced with plastic films with micro-voids/micro-cavities in the film matrix, which will break the internal walls to propagate the internal rupture necessary to break the film.

The plastic push through blister package may be solely made of a single type of plastic. The rupturable lid film and/or the blister layer is formed from a thermoplastic material. The thermoplastic material used for lid film may be BOPET. Both the blister layer and the lid film may be made of a polymer selected from the group consisting of PET, PVC, PE, PP, PETG, and a combination thereof. An additive may be added to introduce the micro-crystallinity to the lid film. The additive may be added as a cavitating agent. Internal brittleness may be created in the cavitated film that configures the substrate to facilitate rupturing while dispensing the product, by adding crystalline particles of random shapes. A base polymer used as a continuous phase of the cavitated film may be selected from PET, PVC, PE, PETG, PS (polystyrene), and a combination thereof. The cavitating agent may be an incompatible polymer selected from the group consisting of cellulose, starch, polyketones, polyesters, polycarbonates, polysulfones, polypropylene, cyclo olefines, polyethylene, and a combination thereof.

The additive may be an inorganic micro-additive selected from the group consisting of silica, talc, mica, titanium dioxide ($TiO_2$), nonstoichiometric silicon oxide ($SiO_x$), and a combination thereof. The additive may be an incompatible polymer selected from the group consisting of cellulose, Cyclic olefines, polypropylene, polyethylene, and a combination thereof. The concentration of the cavitating agent is between about 1 to about 30 wt % based on the total weight of the rupturable lid film.

The barrier properties may be increased in the microcavitated film by additional coating, metallization, and barrier improvement process on the non-sealed area of the cavitated film.

The blister layer and/or the lid film may comprise more than one layer. Preferably, each is produced in a single layer at least because it provides a more efficient manufacturing process.

In one or more embodiments, a method of making a plastic push through blister package is provided. The method may include providing a rupturable lid film and a blister layer; thermoforming the blister layer, thereby making a cavity between the rupturable lid film and the blister layers, and extruding the rupturable lid film to be sealed to the blister layer. The rupturable lid film may include micro-cavities, micro-crystallinity, or a combination thereof.

The rupturable lid film and the blister layer may be made of the same or same class thermoplastic, thereby making the blister package recyclable. The plastic push through blister package may be solely made of a single type of plastic. The rupturable lid film may be coated or laminated with another polymer layer to act as a sealing layer to the blister film. The additive may be added to introduce the micro-crystallinity or microcavities to the lid film. An additional polymeric, inorganic or metallic layer may be coated to the rupturable lid film to improve barrier properties.

The embodiments of the disclosure can be the ultimate sustainable packaging solution customers have been looking for; a robust, all-plastic, recyclable push-through blister packaging that performs equally or better than with respect to both the packageability and the openability of the compared to the current state-of-the-art plastic-aluminum multimaterial blister packs without any external weakening technique.

DETAILED DESCRIPTION

Figure 1:
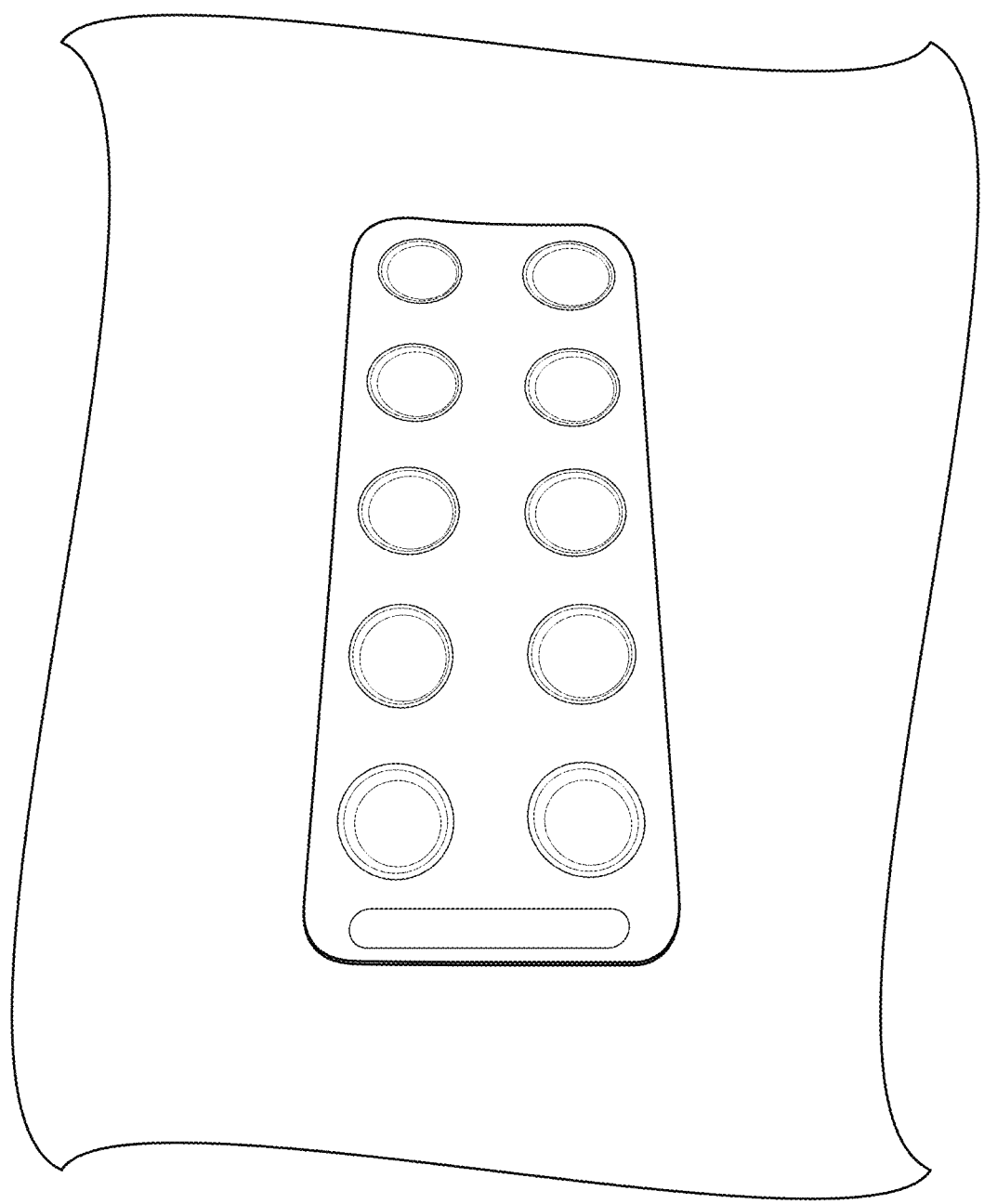
FIG. 1 shows an example of a single material blister pack made from primarily PET polymer on both sides in accordance with one or more embodiments of the present disclosure.

As used herein, the term "about" refers to a range that is +10% from the values recited within the context specifically used.

As used herein, the term "substrate" and "lidding/lid film" are used interchangeably.

As used herein, the term "micro-cavity" or "microcavity" related to a polymer film is defined to be internal discontinuity in the polymer network structure caused by, for example, incompatible polymer or other inorganic particles in the structure.

As used herein, the term "micro-cavity" or "microcavity" and "micro-void" or "microvoid" are used interchangeably.

As used herein, the term "microcrystalline" or "microcrystallinity" is understood to mean a solid form which contains the substance in a predominantly crystalline state in which specific crystals form the predominant part of the crystalline composition, the longest dimension of which is typically in the range of 1 to 100 microns.

As used herein, the term "push-through force", when used with reference to a blister package system, refers to the force required to allow the products or contents to break through the substrate or lid film. The quantified "push through force" is measured using a method described in the United States Pharmacopeia chapter 382 (using 50 mm/min as a test speed) and a Shimadzu EZ-LX or Zwick for a push through force apparatus.

As used herein, the term single component or single material, when used with reference to a blister package system, refers to a system that is essentially constituted with the same family of polymer across the system, for both cavity-forming blister and substrate/lidding materials. As used herein, the term "polymer" is a natural or synthetic chemical compound that is composed of repeating strings of large, chemically-bonded molecules, or monomers.

As used herein, the term "same class", when used with reference to a plastic, refers to a plastic comprising the same majority of monomeric units and/or that can go to the same stream of recycling (meeting the same composition requirement for that recycling stream). As used herein, the term "plastics" are synthetic polymeric materials derived from petroleum. In some embodiments, the term "majority" means about 99%, about 98%, about 97%, about 96%, about 95%, about 94%, about 93%, about 92%, about 91%, about 90%, about 85%, about 80%, about 75%, about 70%, about 65%, about 60%, about 55%, about 50%.

As used herein, the term "consist essentially of", when used with reference to a blister package, means that the blister package can have minor amounts of other ingredients that would not materially affect the present disclosure's function and/or objective in the amount of less than 10% of the total weight of the blister package.

As used herein, the term "rupturable", when used with reference to a part of a blister package, means that the part at least partially includes microcavities and/or microcrystals that reduce push through force of the part.

As used herein, the term "visibly clear" means that the visible light transmission of the composition is greater than 60%, preferably greater than 80%. Translucent means visible light transmission may be less than 60% and opaque means the light transmission may be less 10%. Light transmission of the composition is measured using UV-Vis Spectrophotometry, which determines the absorption or transmission of light by a sample.

The illustrative examples described in the detailed description and claims are not meant to be limiting. Other examples can be utilized, and other changes can be made without departing from the spirit or scope of the subject matter presented herein. It will be readily understood that the aspects of the present disclosure, as generally described herein, can be arranged, substituted, combined, separated, and designed in a wide variety of different configurations, all of which are implicitly contemplated herein.

In some embodiments, the lidding film is made of biaxially-oriented polyethylene terephthalate (BOPET) of a thickness ranging from about 10 to about 100 microns, preferably between about 18 and about 30 microns. In some embodiments, the thickness is from about 10 microns to about 20 microns. In some embodiments, the thickness is from about 20 microns to about 30 microns. In some embodiments, the thickness is from about 30 microns to about 40 microns. In some embodiments, the thickness is from about 40 microns to about 50 microns. In some embodiments, the thickness is from about 50 microns to about 60 microns. In some embodiments, the thickness is from about 60 microns to about 70 microns. In some embodiments, the thickness is from about 70 microns to about 80 microns. In some embodiments, the thickness is from about 80 microns to about 90 microns. In some embodiments, the thickness is from about 90 microns to about 100 microns. The lidding film may be produced via a co-extrusion of films with different layers, including a sealing layer that allows the lidding film to lock-seal to the thicker polymer film.

In some embodiments, the lidding film may be a film embedded with a micro-cavitated polymer, microcrystalline particles or incompatible polymers, or a combination thereof. The film's properties can vary based on the shape, type and size of the particles used. For example, microcrystalline particles can not only create voids but also facilitate the rupturing process.

When the main polymer resins are mixed with small quantities of inorganic or organic additives, or polymer which are incompatible to the main polymer resins in a film forming process, cavitation may occur during its orientation process when the adhesion between a dispersed phase (small quantities of external additive, incompatible polymer) and continuous phase (the main polymer resins) fails. The failure in adhesion may cause the main polymer matrix to stretch while the dispersed phase remains essentially the same dimensions as no force can be transmitted to it across the interface.

Due to the presence of these microcavities which scatter the light, these films may be generally hazy or translucent. In some embodiments, the size of the microcavities can vary from about 10 microns to about 50 microns. By reducing the size of the cavities, and the number of microcavities, the haziness can be reduced but often does not reach full transparency. Methods of creating microcavities on the film can be found, for example, in U.S. Pat. No. 8,986,591, which is entirely incorporated herein by reference.

In some embodiments, the size of the particles used as the cavitating agents may range from about 0.1 to about 10 microns, preferably from about 0.75 microns to about 2 microns. In some embodiments, the microcavities formed in the polymer matrix in the film may be between about 10 to about 50 microns, which depends on the ratio of film stretching that is a part of the process of making a cavitated film.

There are a wide range of the particles which can be used for cavitation, including inorganic and organic materials. The number and size of these cavities and resulting changes in the film properties may depend on the type (e.g., inorganic, polymeric), size, physical form (e.g., crystalline, amorphous) and shape (e.g., spherical, uneven) of the particles.

In general, the effectiveness of the cavitation may be determined by the particle size/shape, and the modulus and the compatibility of the dispersed phase relative to the continuous phase.

Figure 3:
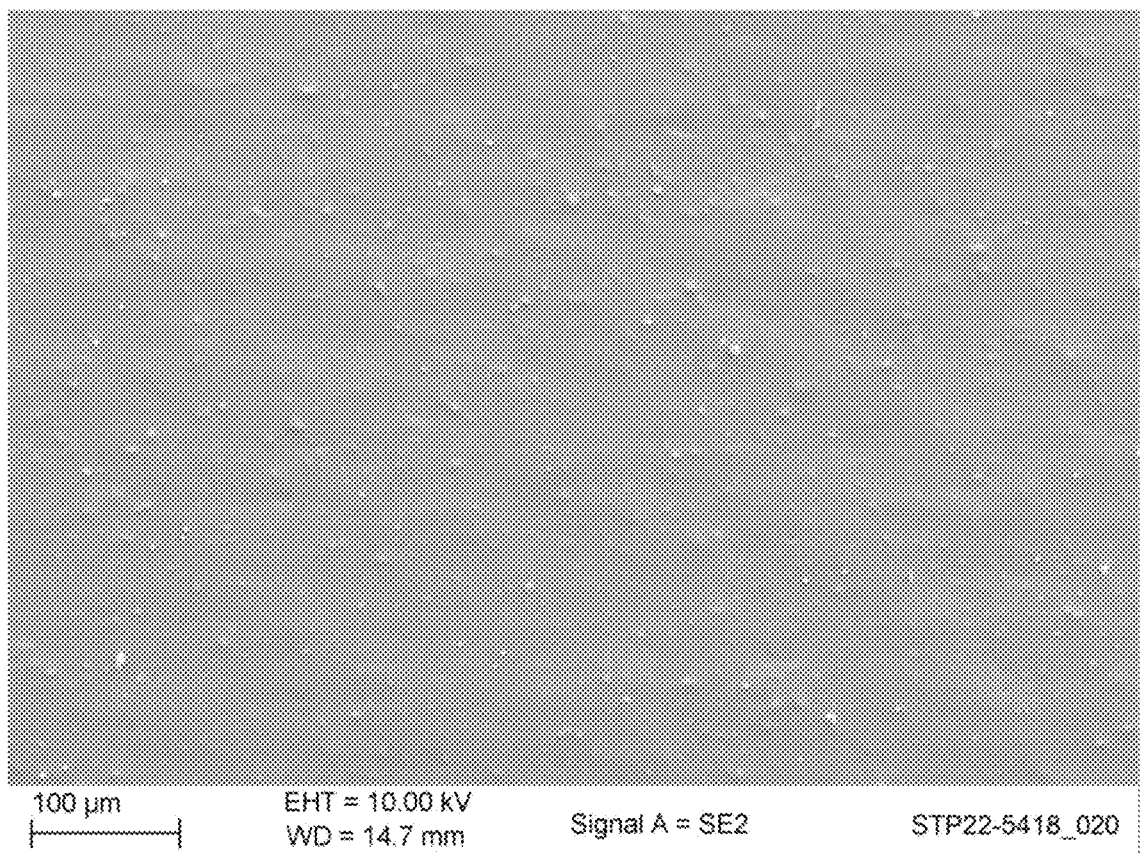
FIG. 3 shows a closer view of the surface of the microcavitated lidding film used in the blister pack showed in FIG. 1, where the impression of the embedded crystalline particles and voids is visible in accordance with one or more embodiments of the present disclosure.

FIG. 3 shows a closer view of the surface of the microcavitated lidding film used in the blister pack showed in FIG. 1. The impression of the embedded crystalline particles and voids are visible in accordance with one or more embodiments of the present disclosure.

Figure 4:
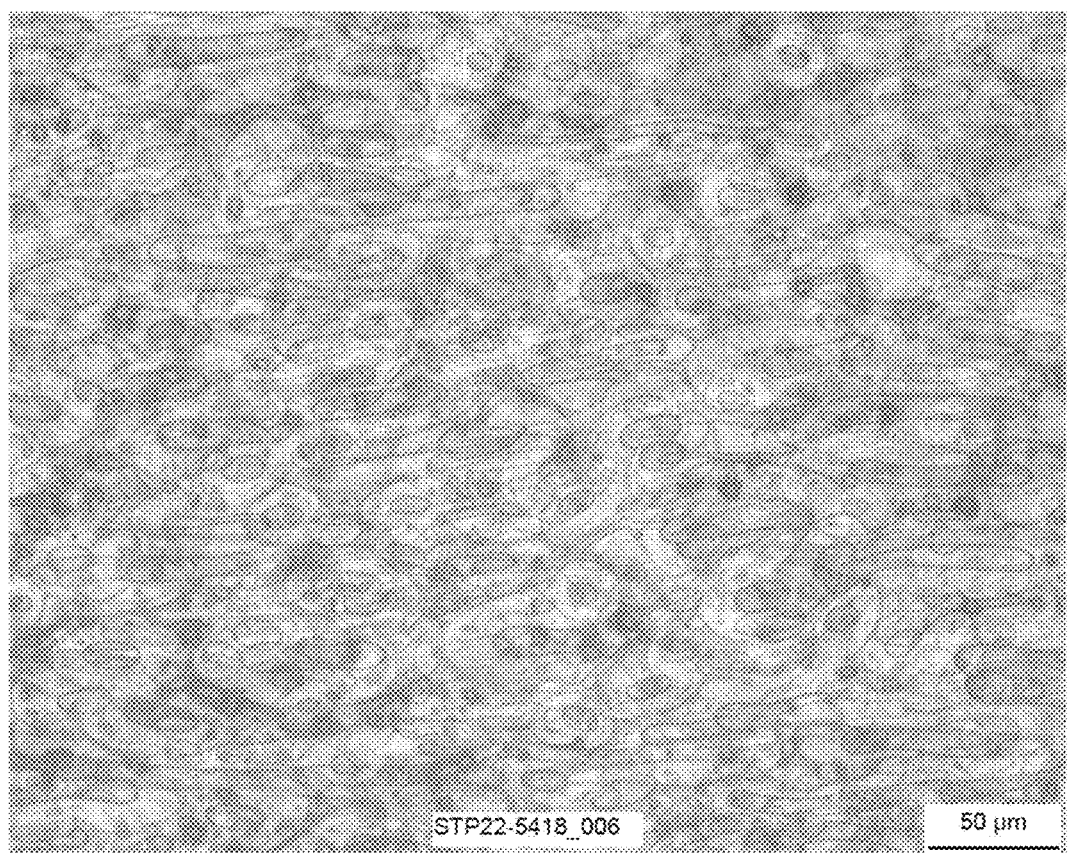
FIG. 4 shows a microscopic view of the surface of the lidding foil used in the blister pack of the FIG. 1 in 200× magnification where microvoids and microparticles are visible in accordance with one or more embodiments of the present disclosure.
Figure 5:
FIG. 5 shows a microscopic view of the surface of the lidding foil used in the blister pack of the FIG. 1 in 550× magnification where microvoids and microparticles are visible in accordance with one or more embodiments of the present disclosure.

FIGS. 4-5 respectively show 200× and 550× magnified views of the surface of the microcavitated lidding film used in the blister pack showed in FIG. 1. In the figures, microvoids and microparticles are visible.

Figure 6:
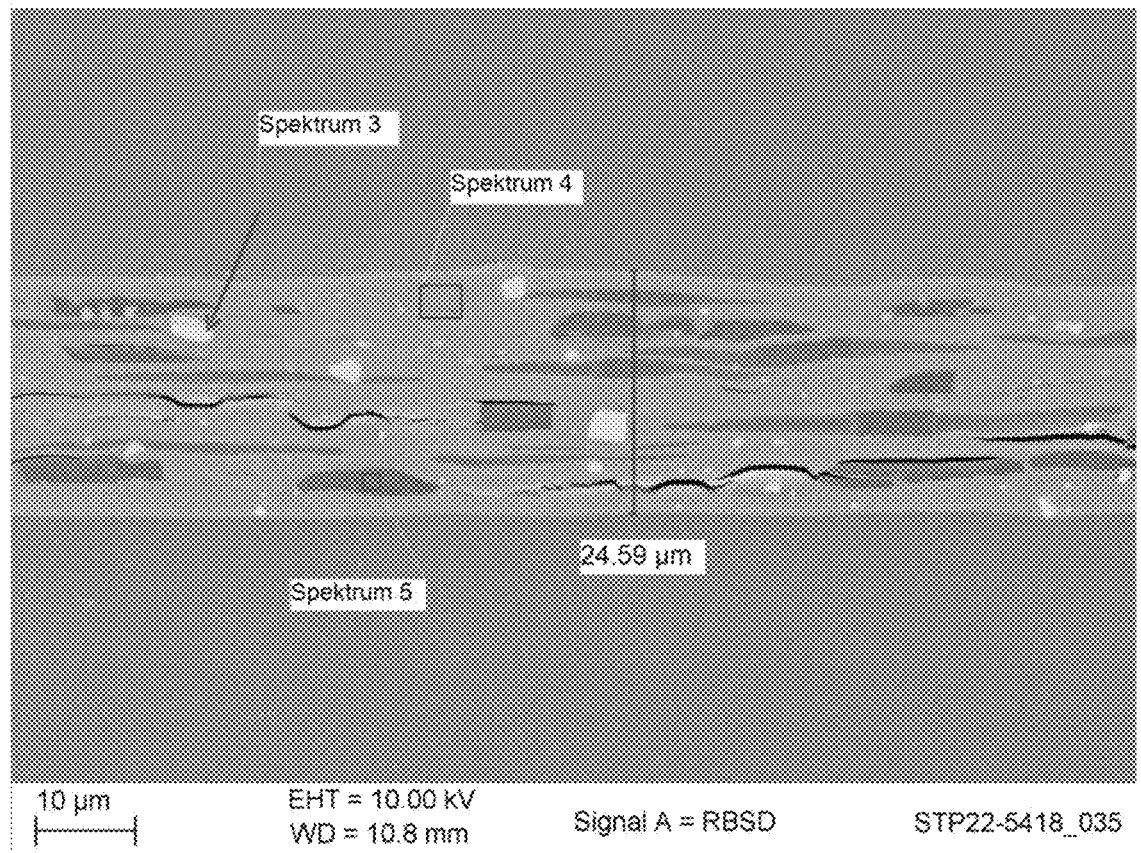
FIG. 6 shows a cross sectional view of the microcavitated lidding film used in the blister pack showed in FIG. 1 through SEM (scanning electron microscope) where the voids and particles embedded in the film is clearly visible in accordance with one or more embodiments of the present disclosure.
Figure 7:
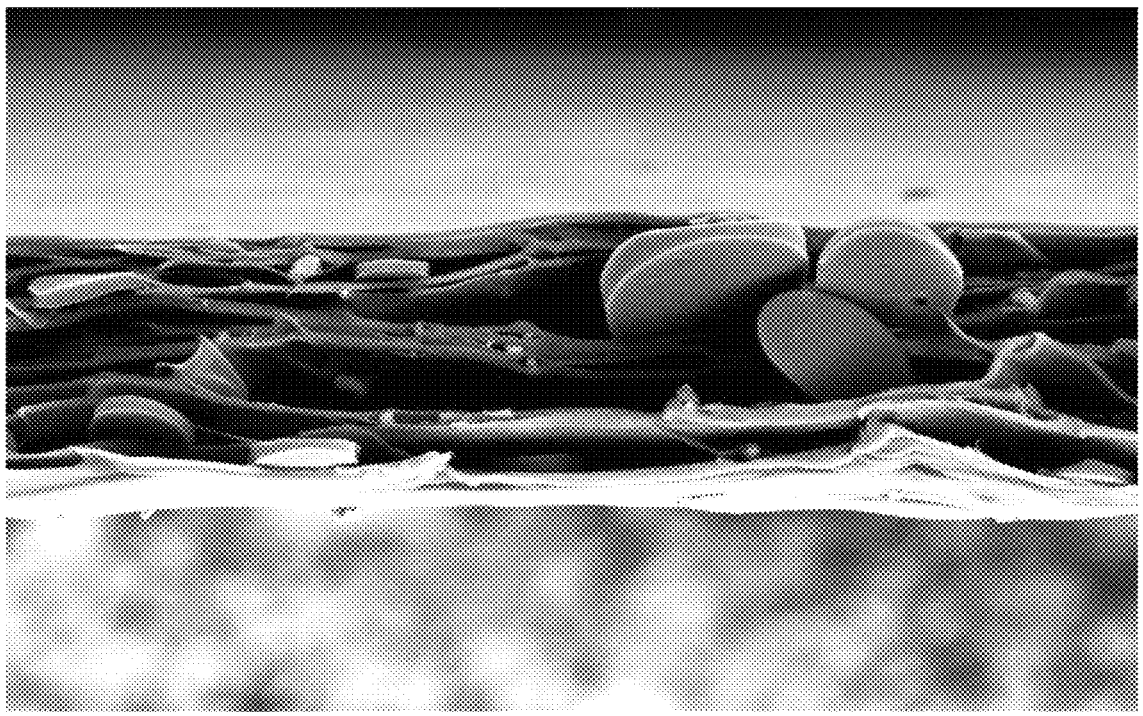
FIG. 7 shows a higher magnified SEM picture of the cross section of the same lidding film as in the FIG. 6 that show cavities and discontinuity in the film matrix created by incompatible polymer or embedded particles, in accordance with one or more embodiments of the present disclosure.

FIG. 6 shows a cross sectional view of the microcavitated lidding film used in the Blister pack showed in FIG. 1 through SEM (scanning electron microscope) where the voids and particles embedded in the film is clearly visible in accordance with one or more embodiments of the present disclosure. FIG. 7 shows a higher magnified SEM picture of the cross section of the same lidding film as in the FIG. 6 that show cavities and discontinuity in the film matrix created by incompatible polymer or embedded particles.

The composition of the polymer mix to make the cavitated film could be about 70-85 wt % main polymer resin, about 10-20 wt % other polymers (e.g., incompatible polymers or facilitators to form cavity), about 1-5 wt % inorganic additives and other film forming facilitating additives.

The thicker polymer film may be thermoformed into a cavity via pressure or vacuum, with or without a plug assistant. In some embodiments, the thicker polymer film may be a class of polyethylene amorphous-terephthalate (PET), preferably an amorphous-polyethylene terephthalate (APET) polymer with a thickness ranging from about 100 to 500 microns, preferably about 250 microns, depending on the cavity sizes. The cavity may be filled with content such as drug tablets, then the lidding film is heat-sealed to the thermoformed film to make the push-through blister pack. The cavities can be tailored to various shapes and dimensions to fit the products properly. In some embodiments, the thicker film used for producing the cavity can be any plastic film used in thermoforming applications, such as, but not limited to, polyethylene terephthalate (PET), polyvinyl chloride (PVC), polyethylene (PE), polypropylene (PP), and polyethylene terephthalate glycol (PETG).

Figure 2:
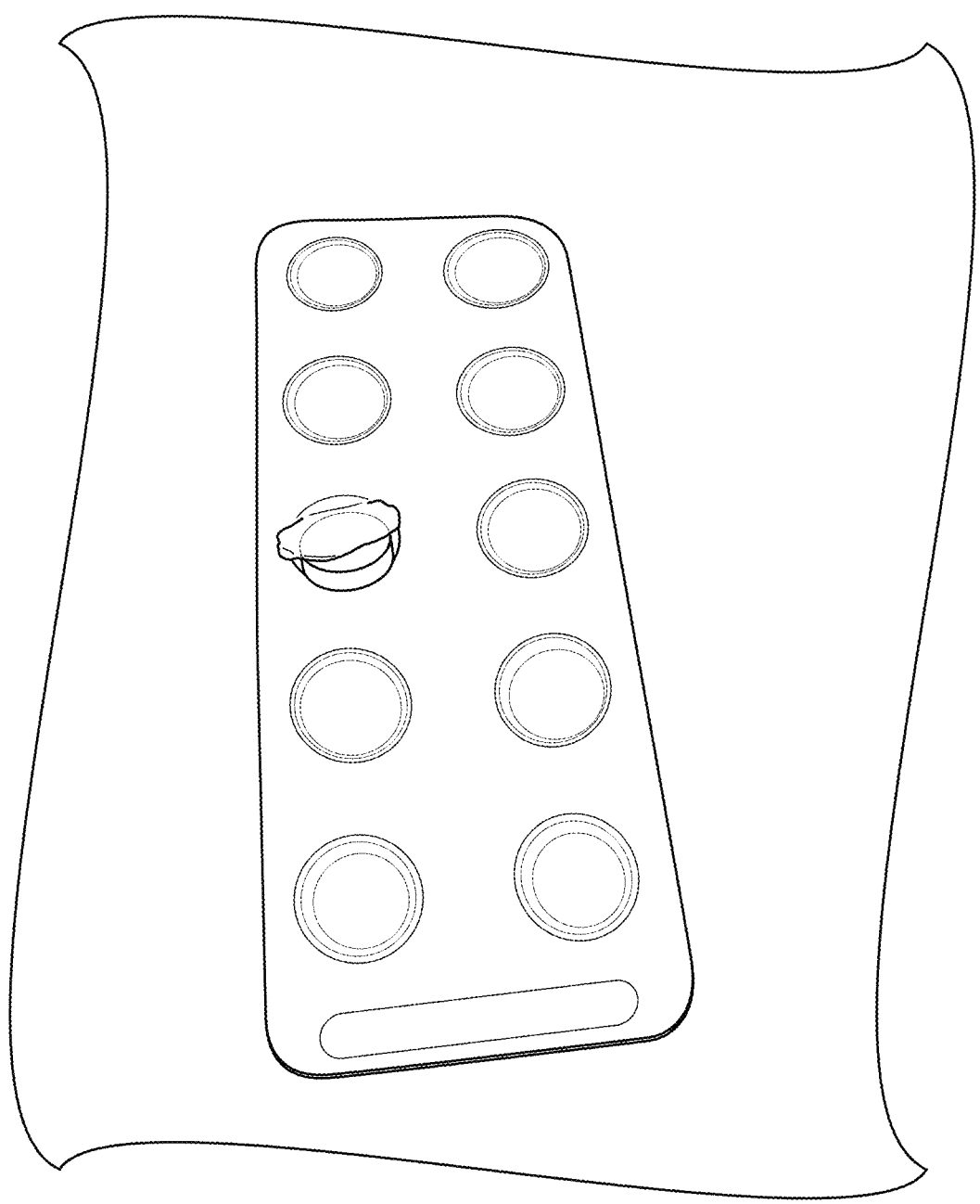
FIG. 2 shows an example of a ruptured blister pack of FIG. 1 to dispense the cavity content in accordance with one or more embodiments of the present disclosure.

FIGS. 1 and 2 show an embodiment of a sealed (FIG. 1), and ruptured (FIG. 2) single material push-through blister pack produced from PET. This embodiment of the single material push-through pack may require significantly lower push-through force to rupture the blister pack for dispensing, and as such also preserves the structural integrity of the cavity content.

The cavitated film used for the lidding film of the push-through blister pack may be produced via a multilayer extrusion-cast process resulting in about 1 to about 7 layers. The lid film may be considered a film or layer even when it contains plural layers. In some embodiments, the basic polymer may be compounded with inorganic micro-additives such as, but not limited to silica, talc, mica, titanium dioxide ($TiO_2$), and nonstoichiometric silicon oxide ($SiO_x$), wherein x is a positive real number less than 2, to introduce the microcrystallinity to the polymer matrix and/or to act as the cavitating agent when the material is oriented.

In some embodiments, other incompatible polymeric materials such as, but not limited to, cellulose, polypropylene, and polyethylene may be incorporated as cavitating agents to introduce discontinuity in the continuous polymer phase during the orientation process of making the lidding film. In some embodiments, the concentration of the cavitating agent may be about 1 to about 30 wt % based on the total weight of the rupturable lid film. After mixing the film with the cavitating agent and extruding, the material is orientated at least in a single direction but usually is oriented in both machine and transversal directions. The stress applied during the orientation process may facilitate the creation of discontinuities between the polymer components and the aforementioned micro-additives and cavitating agents.

In some embodiments, the lidding film may include micro-cavities/micro-voids throughout the polymer matrix. The discontinuity within the polymer matrix via micro-cavities, embedded microcrystalline particles within the matrix or the voids, or a combination thereof promotes the initiation of cracks when an external push-through force is applied to push the content, e.g., a tablet, out of the blister packaging. In some embodiments, other treatments such as corona to improve the surface properties or lacquering to improve the barrier properties and the sealing properties of the lidding film, are incorporated during the film production process.

The present method produces a consistent product with respect to the push-through force required for the rupture of the micro-cavitated/microcrystalline push-through blister pack. As shown in Table 1, the average push-through force of 8 different samples having an about 250-micron PET blister layer and having an about 25-micron PET lid film microcavitated by cavitating agents through which the medication is dispensed in accordance with the present disclosure is 32.07 N with a low degree of deviation between the highest push-through force value of 35.35 N and the lowest of 30.57 N. Comparably, the current state-of-the-art aluminum lid foil blister pack with an about 25-micron lid film requires significantly greater average push through force of 58.20 N but also exhibit higher variance of product consistency/quality as indicated by greater standard deviation value between the samples.

TABLE 1

| | Push Through Force (N) | |
|---|---|---|
| Sample Number | New Film Lid | 25 micron Aluminum Foil Lid |
| 1 | 31.20 | 58.15 |
| 2 | 33.61 | 52.26 |
| 3 | 31.71 | 63.66 |
| 4 | 35.35 | 62.46 |
| 5 | 31.75 | 61.12 |
| 6 | 30.57 | 56.53 |
| 7 | 31.63 | 52.13 |
| 8 | 30.75 | 59.26 |
| Average | 32.07 | 58.20 |
| Standard Deviation | 1.51 | 4.07 |

The blister package may be an all-plastic single material or single component device. In some embodiments, minor amounts of or residual materials other than the plastic can be included in the film or blister side and in recycling applications, the amounts are adapted not to change the recyclable characteristic of the blister package (lid film and blister side). The blister package can be produced to consist of the same plastic or class plastic (e.g., of the types described herein). The blister package can be produced to consist essentially of the same plastic or the same class of plastic (e.g., of the types described herein) wherein the objective is to have a recyclable (single-stream or two-stream recycling) structure. The blister package can be recycled chemically, mechanically, energetically, or by any other means. In theory, the blister package can be packaged into a plastic or paper container or can have attachments that can be easily separated or removed. Those are in addition to the blister package. To clarify, with respect to this paragraph, the blister package refers to the embodiments illustratively described herein. In some embodiments, the blister package may have minor amounts of other ingredients in the amount of less than about 10% of the total weight of the blister package.

The discontinuities or irregularities that are designed to be included in the polymer matrix of the lid film may be throughout the lid film, in a certain select area of the lid film, or randomly distributed in the lid film when produced.

The rupturable substrate or lid film may be visibly clear enough to recognize which content or product is placed inside the cavity between the substrate or lid film and the blister layer. The lid film may also be made to be translucent, opaque, or colored per the product specification or safety requirement. In some embodiments, the lid film may be opaque or colored to preserve the photosensitive/photoreactive properties of the cavity contents. In some embodiments, the lid film may be free from other additives than cavitating agents; plasticizers; or other materials that may affect the translucency or color of the lid film. In some embodiments, an opaque or colored lid may be incorporated as a child-resistant feature of the package. The transparency, translucency or opacity may be subject to visible artifacts of the micro-cavities.

By selectively adding additional non-rupturable layers over the primary push through lid film, and thereby making it challenging to children to open, the blister package may be made to be child-resistant. Preferably, the blister package may be child-resistant and senior-friendly according to the guidance or requirement of an agency or authority such as the Food and Drug Administration (FDA) or European Medicines Agency (EMEA).

Preferably, after the lid is adhered to the cavity side (layer), the resulting structure (and/or the lid side) may not be subject to and/or may not require additional processing to be functional. For example, there may be no additional curing or mechanical application required for the blister pack to provide push-through medication. In some embodiments, the blister pack is configured to have peelable openings. Preferably, the substrate and lid are bonded such that they are not susceptible to being peeled open when used by consumers such as by having a bonding strength of minimum 0.30 kg/cm. Preferably, the opened blister pack may be still one piece (e.g., no peeled away covers or pieces) to make it better and easier for a user to use and recycle the blister pack.

It should be understood that variations, clarifications, or modifications are contemplated. Applications of the technology to other fields not mentioned are also contemplated.

Thus, for example, any sequence(s) and/or temporal order of steps of various processes or methods that are described herein are illustrative and should not be interpreted as being restrictive except as it would be generally understood from the context and description. Accordingly, it should be understood that although steps of various processes or methods or connections or sequence of operations may be shown and described as being in a sequence or temporal order, but they are not necessarily limited to being carried out in any particular sequence or order. It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present disclosure.

It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

The terms "may" or "can" (or similar terms) are sometimes used herein to communicate that embodiments of the disclosure include the described features, attributes, or characteristics but are not necessarily limited to that feature, attribute, or characteristic. This is not to say that the use of "is" or "are" (or similar terms) are used to communicate that embodiments of the present disclosure are limited to that described feature, attribute, or characteristic.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. It is also to be understood that the terminology used herein is for describing particular examples only and is not intended to be limiting.

With respect to the use of substantially any plural and/or singular terms herein, plural to the singular and/or from the singular to the plural would be understood by those of ordinary skill in the art in this field.

While various aspects and examples have been disclosed herein, other aspects and examples will be apparent to those skilled in the art. The various aspects and examples disclosed herein are for purposes of illustration and are not intended to be limiting.

What is claimed is:

1. A plastic push through blister package comprising:
a rupturable plastic lid film or substrate; and
a blister layer formed over the rupturable plastic lid film, thereby making a cavity between the rupturable plastic lid film and the blister cavity forming layer;
wherein the cavity is configured to contain a product,
wherein the rupturable plastic lid film comprises micro-cavities, micro-crystallinity, or a combination thereof,
wherein the plastic push through blister package is made of the same or same class plastic, and
wherein an additive is included in the rupturable lid film to introduce the micro-crystallinity or microcavities to the rupturable lid film.

2. The blister package of claim 1, wherein the rupturable lid film and the blister layer are made of same or same class thermoplastic.

3. The blister package of claim 2, wherein the same or same class plastic is such that the entire blister package becomes recyclable.

4. The blister package of claim 1, wherein the rupturable lid film is formed from a thermoplastic material.

5. The blister package of claim 1, wherein the blister layer is formed from a thermoplastic material.

6. The blister package of claim 4, wherein the thermoplastic material used for the rupturable lid film is BOPET (biaxially oriented polyethylene terephthalate).

7. The blister package of claim 1, wherein both the blister layer and the rupturable lid film are made of a polymer selected from the group consisting of PET (polyethylene terephthalate), PVC (polyvinyl chloride), PE (polyethylene), PP (polypropylene), PETG (polyethylene terephthalate glycol), and a combination thereof.

8. The blister package of claim 1, wherein the additive is an inorganic micro-additive selected from the group consisting of silica, talc, mica, titanium dioxide ($TiO_2$), non-stoichiometric silicon oxide ($SiO_x$), and a combination thereof.

9. The blister package of claim 1, wherein the additive is a cavitating agent added to the rupturable lidding film to create a cavitated film.

10. The blister package of claim 9, wherein a base polymer used as a continuous phase of the cavitated film is selected from PET, PVC, PE, PETG, PS (polystyrene), and a combination thereof.

11. The blister package of claim 9, wherein the cavitating agent is an incompatible polymer selected from the group consisting of cellulose, starch, polyketones, polyesters, polycarbonates, polysulfones, polypropylene, cyclo olefines, polyethylene, and a combination thereof.

12. The blister package of claim 9, wherein the concentration of the cavitating agent is between about 1 to about 30 wt % based on the total weight of the rupturable lid film.

13. The blister package of claim 1, wherein the blister layer comprises more than one layer.

14. The blister package of claim 1, wherein the rupturable substrate comprises more than one layer.

15. A method of making a plastic push through blister package:
providing a rupturable lid film and a blister layer,
thermoforming the blister layer, thereby making a cavity between the rupturable lid film and the blister layers, and
sealing the rupturable lid film to the blister layer,
wherein the rupturable lid film comprises micro-cavities, micro-crystallinity, or a combination thereof,
wherein the plastic push through blister package is made of the same or same class plastic, and
wherein an additive is included in the rupturable lid film to introduce the micro-crystallinity or microcavities to the rupturable lid film.

16. The method of claim 15, wherein the rupturable lid film and the blister layer are made of the same or same class thermoplastic.

17. The method of claim 15, wherein the rupturable lid film is coated or laminated with another polymer layer to act as a sealing layer to the blister film.

18. The method of claim 15, wherein an additional polymeric or inorganic layer is coated to the rupturable lid film to improve barrier properties.

19. The method of claim 15, wherein the same class plastic is a plastic comprising the same majority of monomeric units.

20. The method of claim 15, wherein both the blister layer and the rupturable lid film are made of a polymer selected from the group consisting of PET (polyethylene terephthalate), PVC (polyvinyl chloride), PE (polyethylene), PP (polypropylene), PETG (polyethylene terephthalate glycol), and a combination thereof.

* * * * *